US009381857B1

(12) United States Patent
Arnold et al.

(10) Patent No.: US 9,381,857 B1
(45) Date of Patent: Jul. 5, 2016

(54) VEHICLE HEAT ALARM FOR VEHICLE OCCUPANTS AND PETS

(71) Applicant: All Distributors, LLC, Murfreesboro, TN (US)

(72) Inventors: Bettye Arnold, Murfreesboro, TN (US); Mark Best, Merritt Island, FL (US)

(73) Assignee: All Distributors, LLC, Murfreesboro, TN (US)

( * ) Notice: Subject to any disclaimer, the term of this patent is extended or adjusted under 35 U.S.C. 154(b) by 486 days.

(21) Appl. No.: 13/646,030

(22) Filed: Oct. 5, 2012

(51) Int. Cl.
*B60Q 9/00* (2006.01)

(52) U.S. Cl.
CPC ..................... *B60Q 9/001* (2013.01)

(58) Field of Classification Search
CPC .. F16D 2066/001; G08B 21/22; B60K 35/00; B60K 37/02
USPC ........... 340/449, 522, 573.1, 425.5, 457, 438, 340/581, 584
See application file for complete search history.

(56) References Cited

U.S. PATENT DOCUMENTS

| | | | | |
|---|---|---|---|---|
| 4,872,828 A * | 10/1989 | Mierzwinski | ........... | F23N 5/242 431/16 |
| 5,319,350 A * | 6/1994 | DeMarco | ............ | B60R 25/1004 340/426.22 |
| 5,510,765 A * | 4/1996 | Madau | ................ | B60R 25/1004 340/429 |
| 5,682,144 A * | 10/1997 | Mannik | .................. | G08B 21/06 257/221 |
| 5,686,896 A | 11/1997 | Bergman | | |
| 5,793,291 A * | 8/1998 | Thornton | ............... | B60N 2/002 340/425.5 |
| 5,873,256 A * | 2/1999 | Denniston | .......... | B60H 1/00414 62/244 |
| 5,890,085 A * | 3/1999 | Corrado | ................ | B60N 2/002 180/271 |
| 5,949,340 A | 9/1999 | Rossi | | |
| 5,969,600 A | 10/1999 | Tanguay | | |
| 6,026,340 A * | 2/2000 | Corrado | ................ | B60N 2/002 280/735 |
| 6,028,509 A * | 2/2000 | Rice | ..................... | B60R 16/0373 340/425.5 |
| 6,624,750 B1 * | 9/2003 | Marman | .............. | G08B 25/003 340/4.3 |
| 6,639,512 B1 * | 10/2003 | Lee | ......................... | G08B 21/02 340/425.5 |
| 6,768,420 B2 * | 7/2004 | McCarthy | .............. | B60N 2/002 180/272 |
| 6,812,844 B1 | 11/2004 | Burgess | | |
| 6,847,302 B2 | 1/2005 | Flanagan | | |
| 6,922,147 B1 * | 7/2005 | Viksnins | ................ | B60N 2/002 180/272 |
| 6,922,622 B2 | 7/2005 | Dulin | | |
| 6,998,988 B1 * | 2/2006 | Kalce | .................... | B60N 2/002 340/457.1 |
| 7,104,661 B2 * | 9/2006 | Kane | ...................... | B60R 1/008 248/466 |

(Continued)

OTHER PUBLICATIONS

Fox, Devices Can't Save Babies in Hot Cars, Agency Warns, NBC News, 2012, retrieved on Jul. 31, 2012, retrieved from http://vitals.nbcnews.com/_news/2012/07/30/13033698-devices-cant-save-babies-in-hot-cars-agency-warns?lite.

(Continued)

*Primary Examiner* — An T Nguyen
(74) *Attorney, Agent, or Firm* — Brian S. Steinberger; Law Offices of Brian S. Steinberger, P.A.

(57) ABSTRACT

Systems, devices and methods of using motion detectors and heat sensors inside vehicles for activating alarms to protect vehicle occupants that include babies, children, infirm, elderly and pets. Headrest mounted motion detector(s) and heat sensor detect both motion and selected temperatures to remotely transmit alarm signals to the vehicle horn that can play an SOS sounding.

17 Claims, 5 Drawing Sheets

(56) References Cited

U.S. PATENT DOCUMENTS

| | | | |
|---|---|---|---|
| 7,170,401 B1 * | 1/2007 | Cole | B60N 2/002 340/439 |
| 7,265,678 B2 * | 9/2007 | Chapman, Jr. | G08B 29/181 340/286.05 |
| 7,348,880 B2 * | 3/2008 | Hules | B60R 25/1004 340/425.5 |
| 7,592,905 B2 * | 9/2009 | Barton | B60N 2/002 340/425.5 |
| 7,701,358 B1 | 4/2010 | White | |
| 2002/0116106 A1 * | 8/2002 | Breed | B60N 2/002 701/45 |
| 2002/0121967 A1 * | 9/2002 | Bowen | B60Q 1/52 340/425.5 |
| 2002/0140214 A1 * | 10/2002 | Breed | B60R 1/088 280/735 |
| 2002/0161501 A1 * | 10/2002 | Dulin | B06B 1/0215 701/45 |
| 2003/0090133 A1 * | 5/2003 | Nathan | B60N 2/002 297/217.3 |
| 2003/0122662 A1 * | 7/2003 | Quinonez | B60N 2/002 340/457 |
| 2003/0132838 A1 * | 7/2003 | Toles | B60N 2/0244 340/457 |
| 2003/0168838 A1 * | 9/2003 | Breed | B60R 21/01526 280/735 |
| 2003/0169162 A1 * | 9/2003 | Hyman | B60H 1/00978 340/438 |
| 2004/0089005 A1 * | 5/2004 | Ichishi | B60H 1/00792 62/214 |
| 2005/0024188 A1 * | 2/2005 | Sider | B60H 1/00642 340/425.5 |
| 2005/0225440 A1 | 10/2005 | Simmons | |
| 2005/0275260 A1 | 12/2005 | Patterson | |
| 2006/0033634 A1 * | 2/2006 | Best | B60N 2/002 340/666 |
| 2006/0267780 A1 * | 11/2006 | Adams | A61B 5/1113 340/573.1 |
| 2007/0013531 A1 * | 1/2007 | Hules | B60R 25/1004 340/584 |
| 2007/0045444 A1 * | 3/2007 | Gray | F23N 5/022 236/94 |
| 2007/0096891 A1 | 5/2007 | Sheriff | |
| 2007/0193811 A1 * | 8/2007 | Breed | B60R 21/01536 180/271 |
| 2008/0125941 A1 * | 5/2008 | Mitteer | B60H 1/00742 701/46 |
| 2008/0157985 A1 * | 7/2008 | Wilson | B60N 2/002 340/584 |
| 2009/0174774 A1 * | 7/2009 | Kinsley | B60R 1/00 348/148 |
| 2009/0204297 A1 * | 8/2009 | Friedman | B60H 1/00642 701/46 |
| 2009/0277190 A1 | 11/2009 | Piette | |
| 2010/0090836 A1 | 4/2010 | Trummer | |
| 2011/0074565 A1 * | 3/2011 | Cuddihy | B60N 2/002 340/457 |
| 2014/0015971 A1 * | 1/2014 | DeJuliis | H04N 7/181 348/148 |

OTHER PUBLICATIONS

Fox, Devices Can't Save Babies in Hot Cars, Agency Warns, NBC News, 2012, retrieved on Jul. 31, 2012, retrieved from http://vitals.nbcnews.com/_news/2012/07/30/13033698-devices-cant-save-babies-in-hot-cars-agency-warns?lite, 7 pages.

National Highway Traffic Safety Administration, U.S. Department of Transportation, Reducing the Potential for Heat Stroke to Children in Parked Motor Vehicles: Evaluation of Reminder Technology, Jul. 2012, 42 pages.

Barth, Warning Systems to Detect Children Left in Hot Cars Found Unreliable, Study Finds, Aug. 1, 2012, Consumer Reports News, retrieved on Nov. 19, 2013, retrieved from http://www.consumerreports.org/cro/news/2012/08/warning-systems-to-detect-children-le . . . , 1 page.

Stenquist, How to Remind a Parent of the Baby in the Car?, May 28, 2010, The New York Times, retrieved on Nov. 19, 2013, retrieved from http://www.nytimes.com/2010/05/30/automobiles/20HEAT.html?pagewanted=all&_. . . , 4 pages.

Booth, et al., Hyperthermia Deaths Among Children in Parked Vehicles: An Analysis of 231 Fatalities in the United Stated, 1999-2007, Mar. 4, 2010, Forensic Sci Med Pathol, pp. 99-105, vol. 6.

KidsandCars.org, retrieved on Nov. 19, 2013, retrieved from http://www.kidsandcars.org/heatstroke.html, 5 pages.

Johnson, Where's the Baby? Forgotten in the Hot Car, Jul. 17, 2012, CBN News Medical Reporter, 4 pages.

Devices Exist to Keep Kids from Dying in Cars, but Few are Sold, 2007, The Associated Press, 2 pages.

Grundstein, et al., Quantifying the Heat-Related Hazard for Children in Motor Vehicles, Sep. 2010. American Meteorology Society, pp. 1183-1191.

Smart Technology for Responsible Parents, Backseat Minder, retrieved on Nov. 19, 2013, retrieved from http://www.backseatminder.com/index.html, 2 pages.

Suddenly Safe 'N' Secure Systems, Inc., retrieved on Nov. 19, 2013, retrieved from http://shop.suddenlysafensecuresystems.com/, 2 pages.

Currier, St. Louis Inventors Offer Car-Seat Monitor to Prevent Child Deaths, Jun. 22, 2013, retrieved on Nov. 19, 2013, retrieved from http://www.stltoday.com/news/local/crime-and-courts/st-louis-inventors-offer-car-seat-m . . . , 3 pages.

Car Seat Monitor, Keep Your Child Safe and Comfortable, retrieved on Nov. 19, 2013, retrieved from http://carseatmonitor.com, 2 pages.

ChildMinder, Infant-Toddler Elite Pad System, retrieved on Nov. 19, 2013, retrieved from http://babyalert.info/, 2 pages.

Halo Baby Seat Safety Systems, retrieved on Nov. 19, 2013, retrieved from http://sistersofinvention.com, 15 pages.

Osborne, Camden Police Dog's Death, Tied to Temperature Alarm System's Failure, Raises Concerns, Aug. 15, 2012, retrieved in Oct. 15, 2013, retrieved from, http://articles.philly.com/2012-08-15/news/33201656_1_air-conditioner-police-dog-k-9, 2 pages.

Arnold, B., U.S. Appl. No. 13/757,050, filed Feb. 1, 2013, Office Action Summary mailed Dec. 24, 2014, 23 pages.

* cited by examiner

VEHICLE HEAT ALARM FOR VEHICLE OCCUPANTS AND PETS

FIELD OF INVENTION

This invention relates to vehicles and alarms, and in particular to systems, devices and methods of using motion detectors and heat sensors inside vehicles for activating alarms to protect vehicle occupants that include babies, children, infirm, elderly and pets.

BACKGROUND AND PRIOR ART

The press has an increasing number of stories about occupants left in hot cars that suffer injuries from heat exhaustion to death. In the summer, there are often stories of children, such as babies that have been left in vehicles during hot days, and the babies have died from temperatures rising up to 130 degrees F. or more. These stories often revolve around a child being strapped to a car seat, and left for as little as a short period of time with the windows generally rolled up.

This problem also occurs to others that are also not very mobile such as the infirm and elderly. Additionally parked vehicles in parking lots can often be found with pets, such as dogs, and cats locked in the vehicles during hot days. Similarly, the pet is left at the mercy of dangerous temperatures that can also result in injuries up to death.

The children, infirm, elderly and pets will often have to rely on the stranger passing by to be saved from these heat related dangers. Often the passerby will not be able to save the vehicle occupants unless the vehicle is broken into, and sometimes it is too late at that stage.

Various devices have been proposed over the years as heat alarms for vehicle occupants. However, a large number of such devices require sensors/transducers that must attach directly to an existing rear seat in a vehicle or a child's car seat. See for example, U.S. Pat. No. 5,949,340 to Rossi; U.S. Pat. No. 6,812,844 to Burgess; U.S. Pat. No. 6,922,622 to Dulin et al.; U.S. Pat. No. 7,170,401 to Cole; U.S. Pat. No. 7,701,358 to White et al.; and U.S. Patent Application Publications: 2005/0225440 to Simmons et al.; 2005/0275260 to Patterson et al.; 2007/0096891 to Sheriff et al.; 2009/0277190 to Piette; and 2010/0090836 to Trummer However, these devices generally require having a child strapped to an existing car seat or to a separate child's car seat. Additionally, these devices generally require the use of sensors, such as a pressure transducer attached to the seat that will only be activated by the weight of the sitting child.

These devices are generally not easily moveable from vehicle to vehicle. Devices attached to the existing car seats must be securely mounted and cannot be easily removed. The child car seat sensor devices generally require a consumer to purchase a new child car seat since these sensors are usually built into the seat. Most families with children already have their own car seats, and would most likely not want to change out a functioning car seat.

Additionally, child car seat mounted devices will not work for other passengers in the vehicle that come into contact with dangerous heated temperatures. For example, an elderly person or older child sitting in a front passenger seat or another seat not having the car seat alarm would not be protected against the dangerous heat conditions. Additionally, pets are usually not strapped into child seats or to existing seats in a vehicle. A dog or cat would not be protected by devices that are attached to an existing car seat or removable child seat.

Thus, the need exists for solutions to the above problems with the prior art.

SUMMARY OF THE INVENTION

A primary objective of the present invention is to provide systems, devices and methods of using motion detectors and heat sensors inside vehicles for activating alarms to protect vehicle occupants that include babies, children, infirm, elderly and pets.

A second objective of the invention is to provide systems, devices and methods of activating heat alarms inside vehicles that do not require car seats with built in sensors.

A third objective of the invention is to provide systems, devices and methods of activating heat alarms inside vehicles where the occupant can be located in any part of the vehicle, such as the front seat, back seat, rear compartments such as third row seats, and the like.

A fourth objective of the invention is to provide systems, devices and methods of activating heat alarms inside vehicles, that does not require permanent installation and can be retrofitted into any type vehicle.

A fifth objective of the invention is to provide systems, devices and methods of activating heat alarms inside vehicles, that can be relocated, transferable and portable from vehicle to vehicle.

A sixth objective of the invention is to provide systems, devices and methods of activating heat alarms inside vehicles, that can be easily wired to an existing vehicle horn.

A seventh objective of the invention is to provide systems, devices and methods of activating heat alarms inside vehicles, that can activate an external alarm that is audible both inside and outside of the vehicle without a user having to install separate wiring into a vehicle and without having to connect all components to a vehicle battery and horn.

An eighth objective of the invention is to provide systems, devices and methods of activating heat alarms inside vehicles, that can activate both an internal alarm inside of a vehicle's passenger compartment as well as simultaneously activate an existing vehicle horn.

An ninth objective of the invention is to provide systems, devices and methods of activating heat alarms inside vehicles, mountable to vehicle seat headrests.

A tenth objective of the invention is to provide systems, devices and methods of activating heat alarms inside vehicles, wherein an alarm can possibly activate both a built-in alarm and also the vehicle horn.

An eleventh objective of the invention is to provide systems, devices and methods of activating an alarm for indicating heat levels inside vehicles, by sounding a Morse Code "SOS" signal of 3 short signals, 3 long signals and 3 short signals on a vehicle horn, and/or on another alarm.

A versions of the vehicle heat alarm system can include a housing with a motion detector and a heat sensor, adapted to be mounted to a headrest on a seat inside of a vehicle, an alarm inside of the vehicle, wherein a combination of occupant motion detected by the motion detector inside of the vehicle and a selected temperature detected by the heat sensor above a selected threshold activates the alarm.

The motion detector can include a strap for attaching the motion detector to the headrest, the strap having hook and loop fasteners for adjustably attaching the housing to different sized vehicle headrests.

The system can include a single housing for housing both the motion detector and the heat sensor. The alarm can be built-in the unit itself and/or include an existing horn in the vehicle. An SOS alarm signal can be played on either or both the built in alarm or on the vehicle horn.

The motion detector can include a rear seat facing motion scanning detector, and a side facing motion scanning detector for scanning a front seat.

The motion detector can include a rear seat facing motion scanning detector, and a front seat facing motion scanning detector.

The system can include a wireless transmitter attached to the housing, and a wireless receiver attached to the vehicle horn, wherein the occupant motion detected by the motion detector the selected temperature detected by the heat sensor above the selected threshold causes an alarm signal to be transmitted by the transmitter inside the vehicle to the receiver to activates the horn.

The system can include removable batteries inside the housing for providing power to both the motion detector and the heat sensor, and power supply for the vehicle battery being an existing 12 volt battery inside the vehicle.

The system can include a switch having different heat temperature settings for different occupants inside the vehicle, the different occupants being selected from children, infirm/elderly and pets.

A method of activating a heat dependent alarm inside a vehicle, can include the steps of attaching a motion detector and heat sensor to a headrest above a seat inside of the vehicle, supplying power to the motion detector and the heat sensor, detecting both motion of a vehicle occupant and a selected temperature has been detected inside the vehicle, and activating an alarm when both the motion and the selected temperature have occurred over a selected time period.

The detecting step can include the steps of activating the motion detector only after the selected temperature has been reached by the heat sensor.

The method can include the step of providing both a rear seat facing motion detector and side seat facing motion detector on the headrest.

The method can include the step of providing both a rear seat facing motion detector and front seat facing motion detector on the headrest.

The attaching step can include the step of strapping both the motion detector and the heat sensor to the headrest by a strap having hook and loop fasteners.

The method can include the step of providing an existing horn in the vehicle as the alarm.

The activating step can include the steps of remotely sending an alarm signal from a wireless transmitter adjacent to the motion detector and the heat sensor, and remotely receiving the alarm signal by a wireless receiver located adjacent to the vehicle horn.

The method can include the steps of powering the motion detector and the heat sensor from removable batteries, and powering the vehicle horn by an existing vehicle 12 volt battery.

The method can include the steps of selecting different temperature settings for the heat sensor based on different vehicle occupants, and selecting the different settings from the different occupants being selected from children, infirm/elderly and pets.

The method can include the step of playing an SOS alarm signal on the vehicle horn.

Further objects and advantages of this invention will be apparent from the following detailed description of the presently preferred embodiments which are illustrated schematically in the accompanying drawings.

DESCRIPTION OF THE PREFERRED EMBODIMENTS

Figure 1:
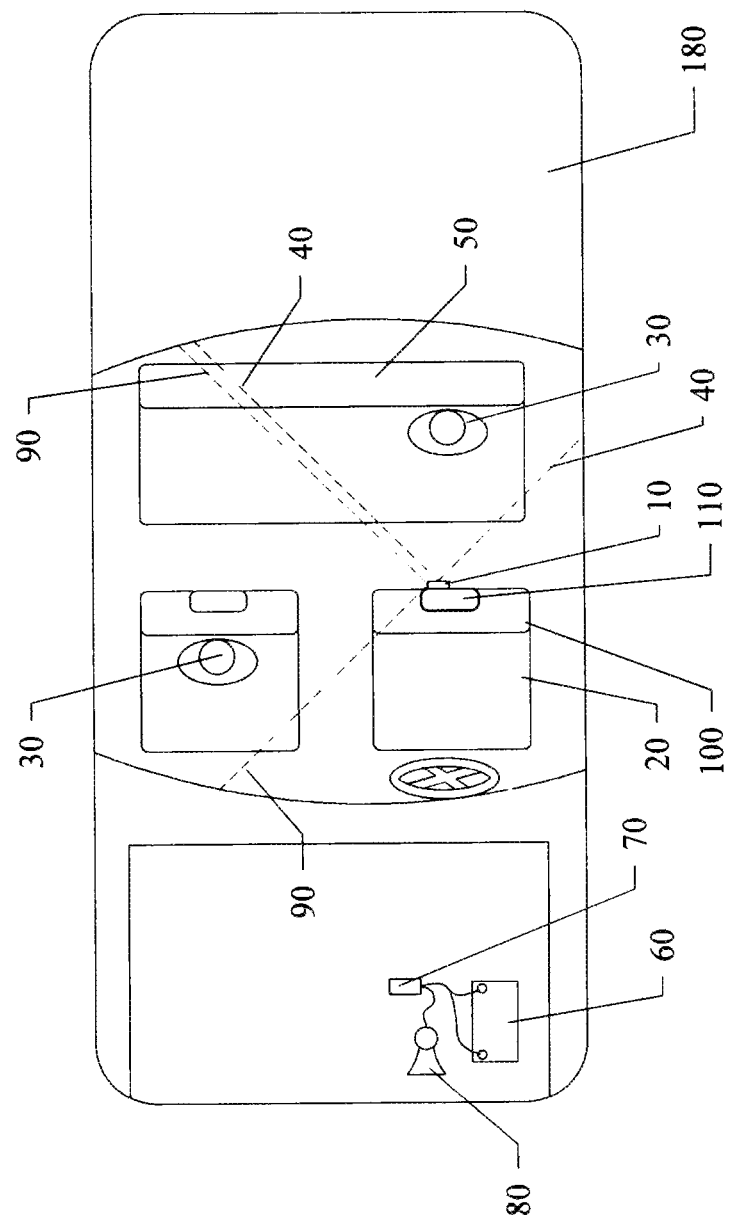
FIG. 1 is a top view of a car with an installed heat alarm system showing monitored subjects and unit having heat sensor with motion detector range of view.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

A listing of the components in the invention will now be described.
10 Motion Detector and Heat Sensor Unit.
15. Transmitter unit
20 Front seat.
30 Monitored subject. Baby, Child, Adult, Senior, Infirm or pet.
40 Rear motion sensor viewing range.
50 Back seat.
60 12 volt car battery.
70 Receiver Unit.
80 Car horn.
90 Side motion sensor viewing range.
100 Front seat backrest.
110 Front seat headrest.
120 Rear motion sensor.
130 Side motion sensor.
140 VELCRO® strap to mount Sentry Unit to headrest or backrest.
150 Indicator LED.
160 Heat sensor and vents.
170 Reset button.
180 Car.
190 Temperature select switch.
200 Internal battery
210 bottom of unit case
220 Printed circuit board FIG. 1 is a top view of a car 180 with an installed heat alarm system showing monitored subjects 30 and unit 10 having motion detector range of view and heat sensor.

Figure 2:
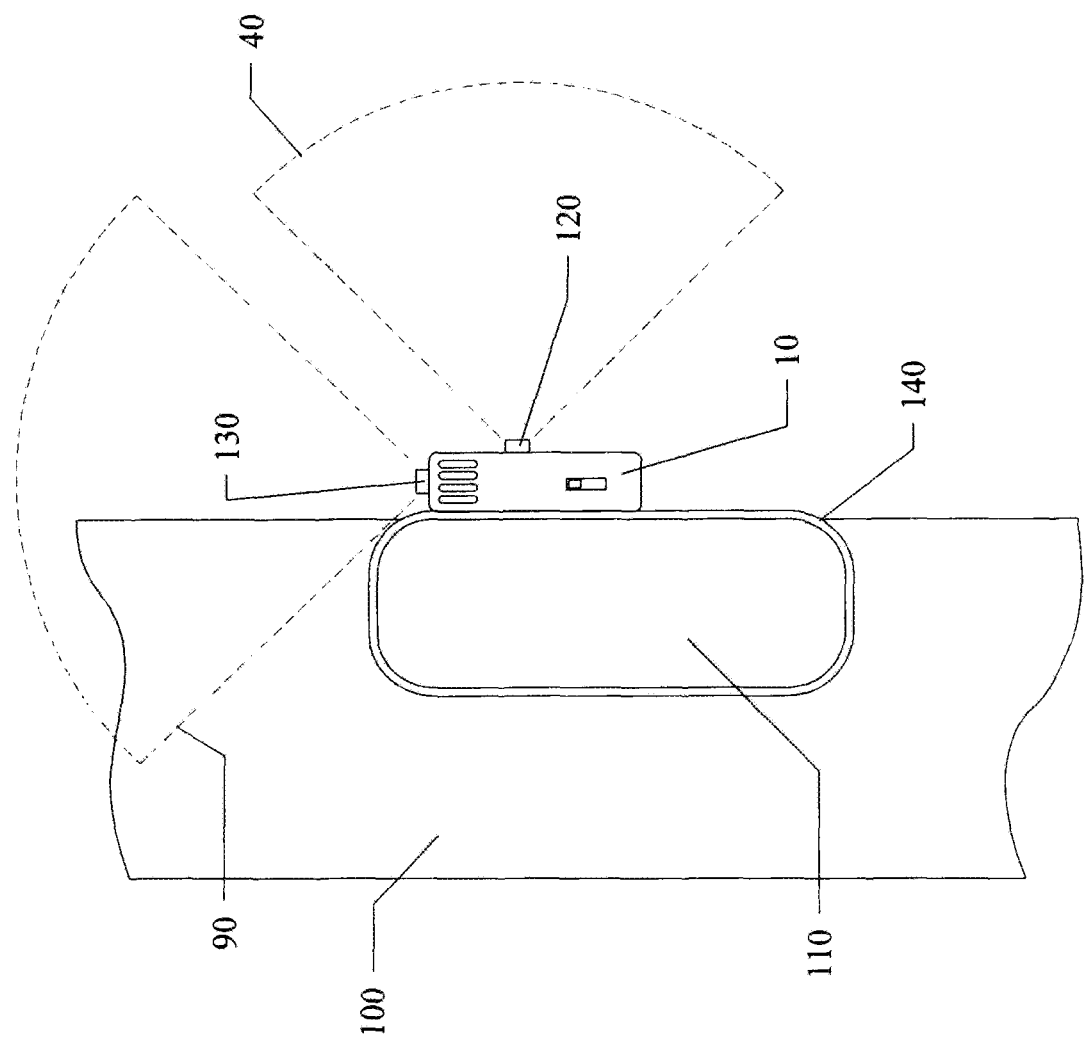
FIG. 2 is an enlarged top view of the headrest mounted motion detector and heat sensor unit of FIG. 1.

FIG. 2 is an enlarged top view of the headrest 110 mounted motion detector and heat sensor unit 10 of FIG. 1.

Figure 3:
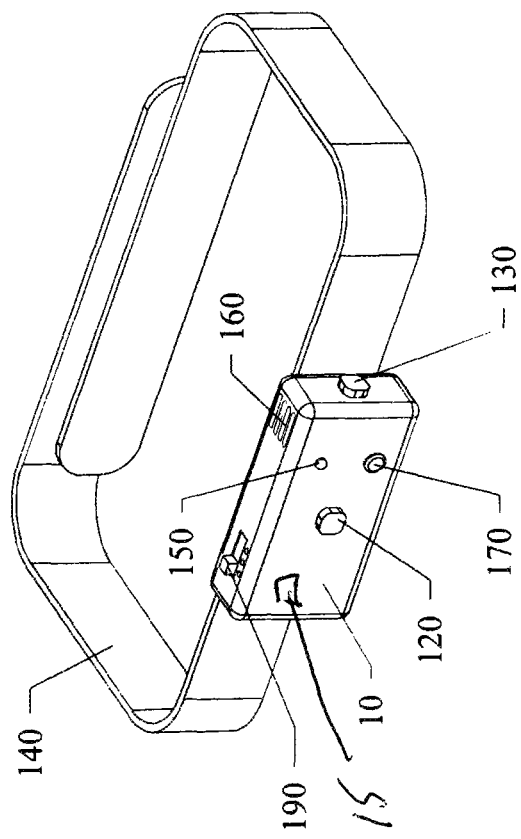
FIG. 3 is a perspective unmounted view of the motion detector and heat sensor unit of FIG. 2.

FIG. 3 is a perspective unmounted view of the motion detector and heat sensor unit of FIG. 2.

Referring to FIGS. 1-3 the novel motion detector and heat sensor unit 10 can be mounted to a front seat headrest 110 above a front seat backrest 100 inside of a vehicle 180. A strap 140 can have hook and loop fasteners (VELCRO®) that allows the unit 10 to be adjustable attached about different sized vehicle headrests 110. The headrest 110 can be located on a front seat 20 or rear (back) seat 50 or third seat (not shown) inside of a vehicle 180.

The unit 10 can include a rear motion sensor 120 and/or side motion sensor 130, that each can have rear viewing range 40 and side viewing range 90, each viewing range being up to approximately 90 to approximately 180 degrees. The motion sensors 120, 130 can detect both front seat and rear seat occupants 30.

The unit 10 can also include a combination of a rear seat facing motion sensor 120 and a front seat facing motion sensor 130. The unit 10 can also include three sensors for detecting rear seats, sides, and front seats inside the vehicle.

Each of the monitored subjects (occupants) 30 can include babies, children, infirm, elderly and pets, located inside of the vehicle. The unit can include preprogrammed computer with the pre-selected temperature threshold selections, and timer that will be described in more detail below.

Figure 5:
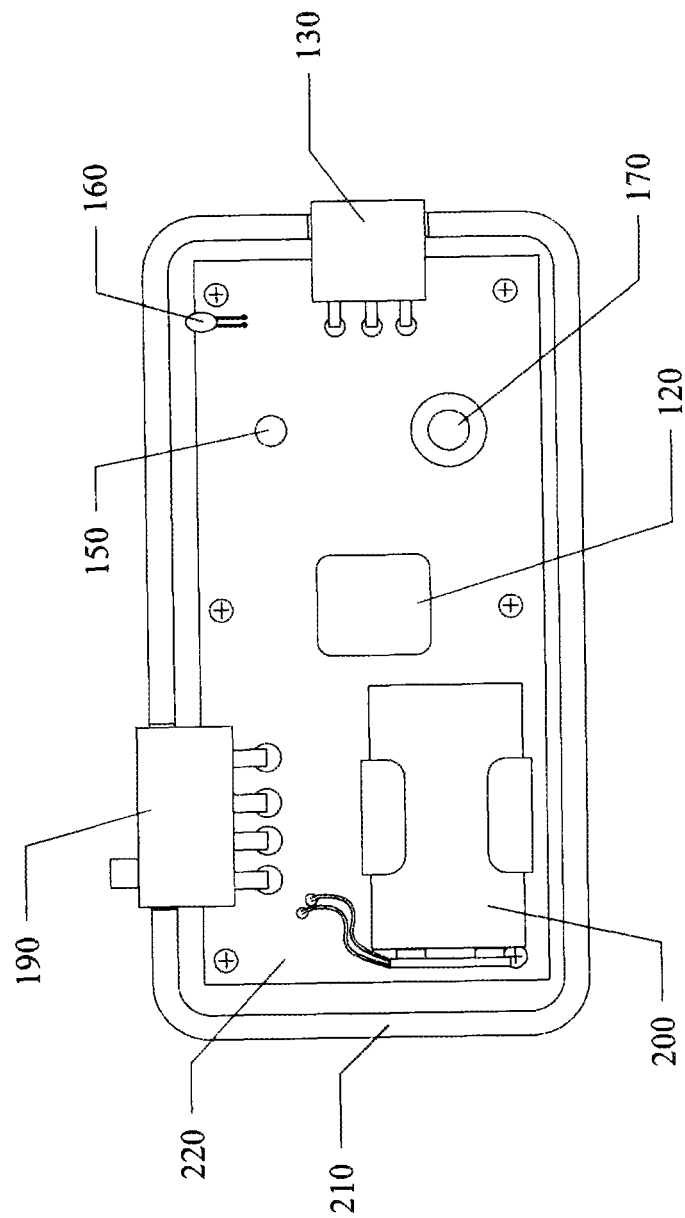
FIG. 5 shows the system components inside of the unit.

Also, inside of the unit 10 can be a heat sensor 160 protected by vents on a side of the unit 10. The unit can be battery powered by batteries inside of the unit 10, such as but not limited to 9 volt batteries, A, AA and/or AAA batteries. For example, the unit 10 can have a single 9 volt battery (similar to those used in smoke detectors). FIG. 5 referenced below has an example of inside components.

A reset switch 170 can be pressed or switched on to activate the unit 10, a light 150, such as an LED (light emitting diode) can turn on when the reset button 170 is first pressed, and the light 150 turned off to indicate the unit is powered off when the reset button 170 is pressed again.

Light 150 can be a single color light or multiple color lights, such as having both green and red colors.

Additionally, the reset button 170 can have a function to reset the unit 10 after the unit 10 has activated alarms.

Additionally, the indicator light 150 can have a low setting or off setting when button 170 is pressed which indicates low or dead battery inside the unit 10. The indicator light 150 can also flash different colors (such as red) for example, every 6 seconds when it is time to change the unit batteries. The unit can still function for a short time when the flashing has been reached. The batteries are intended to allow the unit to be operational for at least one year.

The indicator light 150 can also be used as a motion detector(s) (120, 130) test light. A double press of the reset 170 can turn on the motion detector(s) 120, 130. The indicator light 150 can turn red for a time period (for example 20 seconds) while the detector(s) 120, 130 are warming up. After the warming up the indicator 150 can turn green which indicates a test period (for example 1 minute test period). Any motion detected after this 1 minute test period can cause the indicator light 150 to flash red and green verifying the function of the motion detector(s) 120, 130. This test function can time out after 1 minute in order to preserve battery power.

Additionally, the reset button 170 can be used to reset the motion detector(s) 120, 130 and reset the unit 10 after an alarm has been sounded or during an alarm sounding condition.

Additionally, the light 150 can blink or be multiple lights, such as multiple LEDS to function as a visual alarm when the motion detector and sensor unit becomes activated.

Still furthermore, the motion detector and sensor unit can include an extra audio alarm, such as but not limited to buzzer, another horn, and the like. For example, the 9 volt battery can activate a smoke alarm type buzzer as an internal alarm inside the vehicle.

As such, the invention can have a dual powered alarm that activates both a vehicle horn under the vehicle hood, as well as a buzzer type alarm on the unit 10 inside the vehicle passenger compartment.

Additional switches on the unit 10 can include a temperature select switch 190 having different positions. For example, temperature select switch can have a first position for activating the alarm (to be discussed) for babies and children for temperatures of between approximately 100 F to 105 F, a second select position for temperatures between approximately 106 F to 109 F, and a third select position for temperatures at approximately 110 F and higher.

Motion detector and heat sensor unit 10 can have send a wireless signal from a transmitter unit 15 to a remotely located receiver unit 70 that can be located under the hood of the vehicle 180. The receiver unit 70 can be wired to both the existing vehicle 12 volt car battery 60 that is wired to the existing vehicle horn 80.

Although the unit 10 is described as being battery powered, the unit 10 can also be hardwired if selected to the existing vehicle power, such as to a cigarette lighter adapter, and the like.

The motion detector and heat sensor unit 10 can be set in a "power save" mode by default and the motion detectors (120, 130) are not scanning for motion, until ambient temperature inside the vehicle 180 reaches a selected temperature set threshold. For example, a first position of the switch 190 would keep the motion detectors 120, 130 off until a first temperature of approximately 100 F to approximately 105 F is reached. When the selected temperature threshold is reached the unit 10 the motion detectors 120, 130 turn on and start scanning.

In operation, the unit 10 can be programmed to send a signal to sound the vehicle horn 80 after a selected time period has been reached. For example, the unit 10 can be programmed to sound the vehicle horn 80 after approximately 5 minutes when the inside vehicle temperature has reached at least approximately 100 degrees and motion of an occupant has been detected inside the vehicle 180.

With the novel invention, the horn can be activated for a continuous horn signal or intermittent horn signal. The invention can also be programmed to have the horn emit an emergency signal such as the international distress SOS signal when activated in Morse Code. The international SOS being three dits (short pulse signals) followed by three dahs (three longer signals), followed by three dits (short pulse signals).

Different scenarios can include the vehicle is already hot, or the vehicle was initially cool, but has been closed up and abandoned with an occupant (baby, child, infirm, elderly person) inside.

Scenario One: Vehicle Already Hot Mode

In this example, the vehicle has been sitting in the sun with windows rolled up. The temperature inside is already above approximately 105 degrees, and the motion detectors 120, 130 is now scanning for motion. When an occupant, such as a baby or child is placed in a child seat, or on an existing seat, the motion detectors 120, 130 on unit 10 detects motion and samples temperature inside the vehicle. Once the temperature is above the selected set point (here for example, approximately 105 F), a timer inside the unit 10, can start counting and the internal vehicle temperatures is monitored for approximately 5 minutes. If after 5 minutes, the temperature inside the vehicle has not dropped below a set point (such as for example, below 100 F), an alarm signal be transmitted by transmitter 115 to the receiver 70 under the hood to activate the vehicle horn 80 to run an SOS sequence, and the like.

The invention can work under the condition that temperature inside the vehicle will quickly and rapidly drop below a set point when the vehicle is ventilated, such as when the vehicle is put in motion with windows opened and/or the air conditioning system in the vehicle is turned on.

This scenario can include a set condition, that the alarm will instantly sound off without delay if a higher preselected temperature of for example, 110 F and motion inside the vehicle are simultaneously detected.

Scenario Two: Vehicle Initially Cool, but has been Closed Up and Abandoned with Occupant Inside In this scenario, the unit 10 is in a sleep type mode. If the temperature inside the vehicle raises above a set point (for example above approximately 105 F), the unit 10 wakes up and sensors 120, 130 begin scanning for motion. If an occupant is then detected, the unit 10 starts the timer, which can be programmed to run for approximately 5 minutes. If after 5 minutes the interior temperature is still above the set point and motion is still detected, the unit 10 would transmit a signal to the receiver unit 70, which would activate vehicle horn 80 to play a distress code, such as SOS, and the like.

This scenario can also include a set condition, that the alarm will instantly sound off without delay if a higher preselected temperature of for example, 110 F and motion inside the vehicle are simultaneously detected.

Figure 4:
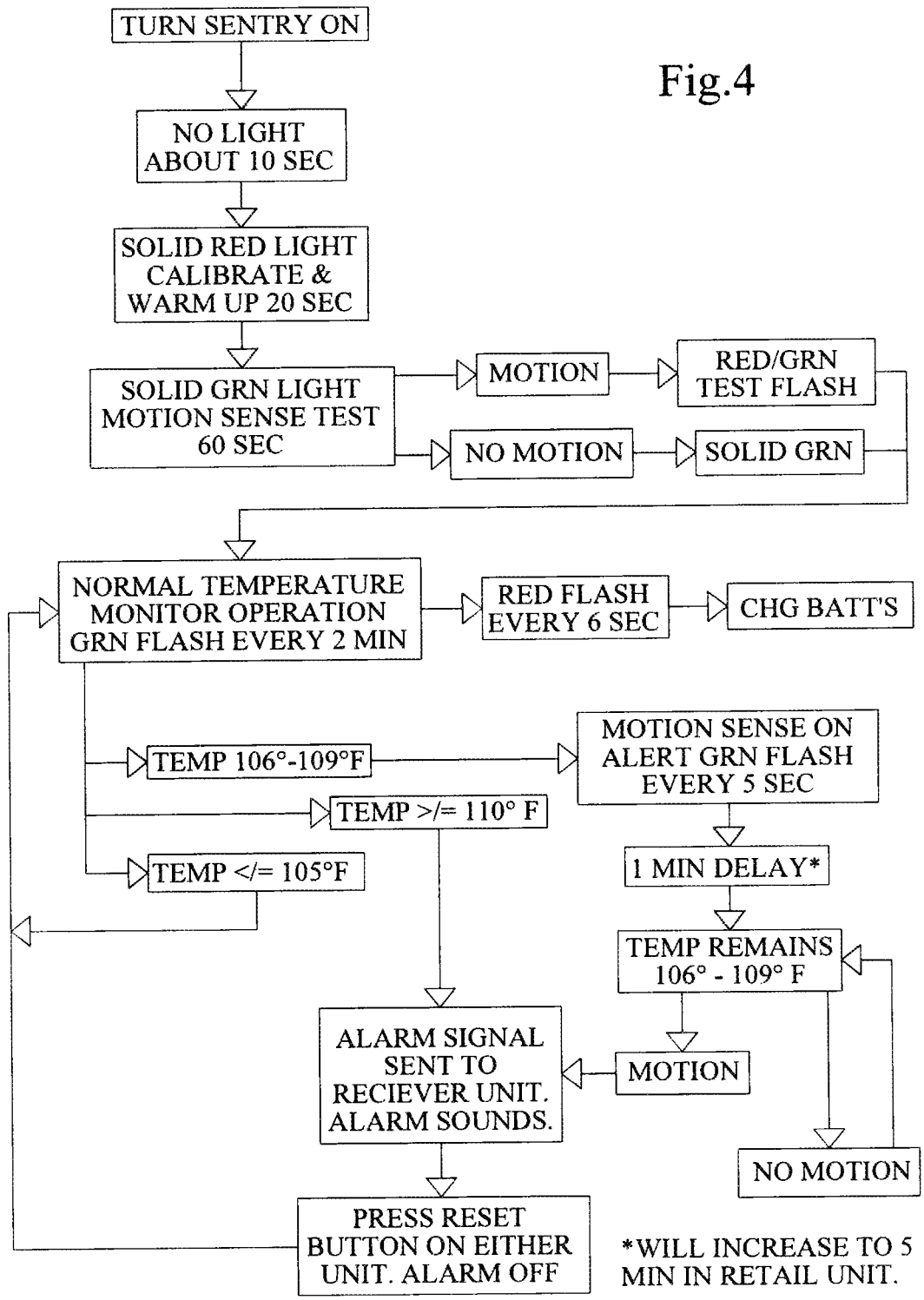
FIG. 4 is a flowchart running through the operational steps of the installed heat alarm system with motion detector and heat sensor unit.

FIG. 4 is a flowchart running through the operational steps of the installed heat alarm system with motion detector and heat sensor unit 10.

FIG. 5 shows the system components inside of the unit 10. The bottom case 210 of the unit 10 can include rear motion sensor 120, side motion sensor 130, indicator LED 150, heat sensor and vents 160, reset button 170. 190 Temperature select switch 190, internal battery, 200 (such as but not limited to replaceable 9 volt or A or AA or AAA batteries), and printed circuit board 220.

Although the described embodiments has the novel unit 10 attached to a head rest inside of a vehicle. The unit can also be attached to other supports inside of a vehicle.

Additionally, the novel unit with temperature sensing and monitoring can be attached directly to an individual inside of the vehicle, such as but not limited to be attached to a waist of an infant and/or child, and/or about an animal inside of the vehicle such as formed as a smaller component attached similar to a collar on a dog or cat, etc.

With these other applications, the unit can be used with only the temperature monitor and built-in alarm, so that the temperature of the infant and/or child, and/or pet is monitored to make sure that dangerous heat conditions are detected and the built-in unit alarm is sounded. Additionally, these applications can also be used with both the built-in alarm and the vehicle alarm.

Still furthermore, the novel system can be used to activate other alarms, such as in a phone app where a smart phone, such as but not limited to an IPHONE®, and the like, is sent the alarm signal so that a parent and/or other third party is notified of the dangerous heat conditions.

Additionally, the unit can have other indicators thereon that give out visual readings of the actual temperature itself so that others can monitor the temperature. Additionally, the actual temperature reading being monitored by the unit can be sent to remote locations, for example through the web and/or by phone apps to smart phones and/or to third party monitoring locations as desired.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A vehicle heat alarm system, comprising:
   a single housing having a forward facing wall and a rearward facing wall and side walls facing in different directions from the forward facing wall and the rearward facing wall, one of the side walls supporting a front seat facing scanning motion detector covering at least a front seat portion of the vehicle and the rearward facing wall supporting a separate rear seat facing scanning motion detector covering a rear seat of the vehicle, and the single housing having a heat sensor, and a removable strap mount adapted for mounting the single housing to a headrest on a seat inside of a vehicle; and
   an alarm inside of the vehicle, wherein a combination of occupant motion detected by at least one of the rear seat and the front seat motion scanning detectors inside of the vehicle and a selected temperature detected by the heat sensor above a selected threshold activates the alarm.

2. The vehicle heat alarm system of claim 1, wherein the removable strap mount having hook and loop fasteners for adjustably attaching the housing to different sized vehicle headrests.

3. The vehicle heat alarm system of claim 1, wherein the alarm is an existing horn in the vehicle.

4. The vehicle heat alarm system of claim 3, further comprising:
   an SOS alarm signal played on the vehicle horn.

5. The vehicle heat alarm system of claim 1, wherein the single housing further includes:
   a separate side facing motion scanning detector for scanning inside of the vehicle.

6. The vehicle heat alarm system of claim 1, further comprising:
   a wireless transmitter attached to the housing; and
   a wireless receiver attached to the vehicle horn, wherein the occupant motion detected by the rear seat and the front seat motion scanning detectors and the selected temperature detected by the heat sensor above the selected threshold causes an alarm signal to be transmitted by the transmitter inside the vehicle to the receiver to activate the horn.

7. The vehicle heat alarm system of claim 1, further comprising:
   removable batteries inside the single housing for providing power to both the rear seat and the front seat motion scanning detectors and the heat sensor; and
   power supply for the vehicle battery being an existing 12 volt battery inside the vehicle.

8. The vehicle heat alarm system of claim 1, further comprising:
   a switch having different heat temperature settings for different occupants inside the vehicle, the different occupants being selected from children, infirm/elderly and pets.

9. A method of activating a heat dependent alarm inside a vehicle, comprising the steps of:
   providing a single housing having a forward facing wall and a rearward facing wall and side walls facing in different directions from the forward facing wall and the rearward facing wall;
   supporting a rear seat motion scanning detector from the rearward facing wall, for covering a rear seat in the vehicle; and
   supporting a front seat motion scanning detector from one of the side walls, for covering at least a front seat portion in the vehicle, together;

providing a heat sensor in the single housing;

mounting using a removable strap mount, the single housing with the front seat motion scanning detector and the rear seat motion scanning detector and the heat sensor to a headrest above a seat inside of the vehicle;

supplying power to the rear seat and the front eat motion scanning detectors and the heat sensor;

detecting motion of a vehicle occupant in at least one of the rear seat and the front seat portion of the vehicle, by at least one of the rear vehicle seat and the front vehicle seat motion scanning detectors;

detecting a selected temperature inside the vehicle; and activating an alarm when both the motion of the vehicle occupant and the selected temperature have occurred over a selected time period.

10. The method of claim 9, wherein the detecting step includes the step of:

activating the rear seat motion scanning detector and the front seat motion scanning detector only after the selected temperature has been reached by the heat sensor.

11. The method of claim 9, further comprising the step of:

combining a separate side seat facing motion detector with the rear seat motion scanning detector and the front seat motion scanning detector in the single housing.

12. The method of claim 9, wherein the mounting step includes the step of:

strapping the single housing to the headrest using hook and loop fasteners.

13. The method of claim 9, further comprising the step of:

providing an existing horn in the vehicle as the alarm.

14. The method of claim 13, wherein the activating step includes the steps of:

remotely sending an alarm signal from a wireless transmitter adjacent to the front seat and the rear seat motion scanning detectors and the heat sensor; and remotely receiving the alarm signal by a wireless receiver located adjacent to the vehicle horn.

15. The method of claim 14, further comprising the steps of:

powering the front seat and the rear seat motion scanning detectors and the heat sensor from removable batteries; and powering the vehicle horn by an existing vehicle 12 volt battery.

16. The method of claim 10, further comprising:

selecting different temperature settings for the heat sensor based on different vehicle occupants; and selecting the different settings from the different occupants being selected from children, infirm/elderly and pets.

17. The method of claim 14, further comprising the step of:

playing an SOS alarm signal on the vehicle horn.

* * * * *